United States Patent Office 2,764,063
Patented Sept. 25, 1956

2,764,063
THREE ELEMENT PHOTOGRAPHIC OBJECTIVE

Günther Lange, Konigsbronn, Wurttemberg, Germany, assignor to Carl Zeiss, Heidenheim (Brenz), Wurttemberg, Germany Application September 16, 1954, Serial No. 456,431

Claims priority, application Germany September 23, 1953

4 Claims. (Cl. 88—57)

The present invention concerns photographic objectives, which consist of three elements separated from one another by air spaces, namely of a collective meniscus-shaped front element, of a dispersive biconcave middle lens and of a collective rear element, which consists of two cemented together lenses of opposite refractive power, whereby the cement surface of the rear element turns its convex side towards the middle lens and has a radius which is longer than 30% but shorter than 50% of the objective focal length.

In order to attain in such objectives a balanced coma correction, the dispersive biconcave middle lens in accordance with the invention is bent in such manner, that the radius of the surface facing the front element is longer in amount than 95% but shorter than 150% of the objective focal length, and the first air space is selected smaller than the second, and the over-all length is selected within the limits $0.20 \cdot f$ and $0.50 \cdot f$, and if further the curvatures of the glass-air surfaces are adjusted to one another, that the sum of the refractive powers of the two outer surfaces lies within the limits $2.8/f$ and $4.2/f$, and that the sum of the refractive powers of the two surfaces of the two collective outer elements turned towards the middle lens lies within the limits $-0.6/f$ and $-0.15/f$, and that the sum of the refractive powers of the two concave surfaces of the middle lens lies within the limits $-3.2/f$ and $-2.6/f$.

Figure 1:
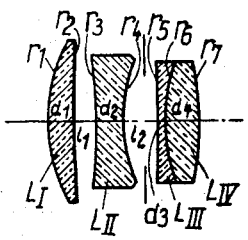
Figure 2:
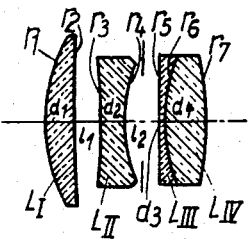
Figure 3:
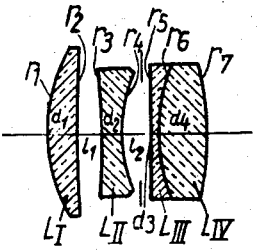

The following numerical values and the accompanying illustrations or Figures 1 to 3 refer to three execution examples in accordance with the invention. These objectives are corrected for a maximum relative aperture of 1:3.5 and a serviceable image angle of $\pm 28°$.

Within this range these three objectives show, beside a good coma correction, a good flattening of the image field and only slight astigmatism.

It is advisable to depart from the values specified in the numerical examples by not more than $\pm 0.15/f$ in reference to the individual refractive powers, and in reference to the individual lens thicknesses and air distances by not more than $\pm 0.025 \cdot f$.

In the figures and the numerical examples there are designated by $r_1$ to $r_7$ = the radii of the refracting surfaces
by $d_1$ to $d_4$ = the axial lens thicknesses
by $l_1$, $l_2$ = the axial distances between the lens elements
$N_D$ = the refractive index for the "D" line of the lens material
$V$ = the dispersion ratio or Abbe number of the lens material
$f$ = the objective focal length = 1
$\Delta N/r$ = the refractive power of the surface having the radius $r$.

Example I

| Lenses | Radii | Thicknesses and Distances | $N_D$ | V | $\Delta N/r$ |
|---|---|---|---|---|---|
| $L_I$ | $r_1=+0.331164$ | $d_1=0.05142$ | 1.72000 | 50.3 | +2.17415 |
|  | $r_2=+2.70729$ |  |  |  | −0.26595 |
|  |  | $l_1=0.03955$ |  |  |  |
|  | $r_3=-1.10928$ |  |  |  | −0.58444 |
| $L_{II}$ |  | $d_2=0.05471$ | 1.64831 | 33.8 |  |
|  | $r_4=+0.290927$ |  |  |  | −2.22843 |
|  |  | $l_2=0.05933$ |  |  |  |
|  | $r_5=-3.17162$ |  |  |  | −0.16765 |
| $L_{III}$ |  | $d_3=0.01318$ | 1.53172 | 48.9 |  |
|  | $r_6=+0.350781$ |  |  |  | +0.53675 |
| $L_{IV}$ |  | $d_4=0.06592$ | 1.72000 | 50.3 |  |
|  | $r_7=-0.564016$ |  |  |  | +1.27656 |

Example II

| Lenses | Radii | Thicknesses and Distances | $N_D$ | V | $\Delta N/r$ |
|---|---|---|---|---|---|
| $L_I$ | $r_1=+0.335931$ | $d_1=0.05220$ | 1.72000 | 50.3 | +2.14330 |
|  | $r_2=+2.74632$ |  |  |  | −0.26217 |
|  |  | $l_1=0.05352$ |  |  |  |
|  | $r_3=-1.10918$ |  |  |  | −0.60648 |
| $L_{II}$ |  | $d_2=0.04891$ | 1.67270 | 32.2 |  |
|  | $r_4=+0.299403$ |  |  |  | −2.24680 |
|  |  | $l_2=0.06684$ |  |  |  |
|  | $r_5=\infty$ |  |  |  | 0.00000 |
| $L_{III}$ |  | $d_3=0.01318$ | 1.59551 | 39.2 |  |
|  | $r_6=+0.335931$ |  |  |  | +0.44203 |
| $L_{IV}$ |  | $d_4=0.07910$ | 1.74400 | 44.7 |  |
|  | $r_7=-0.597381$ |  |  |  | +1.24544 |

Example III

| Lenses | Radii | Thicknesses and Distances | $N_D$ | V | $\Delta N/r$ |
|---|---|---|---|---|---|
| $L_I$ | $r_1=+0.32776$ | $d_1=0.05200$ | 1.72000 | 50.3 | +2.19673 |
|  | $r_2=+2.66040$ |  |  |  | −0.27064 |
|  |  | $l_1=0.05000$ |  |  |  |
|  | $r_3=-1.12187$ |  |  |  | −0.59436 |
| $L_{II}$ |  | $d_2=0.04267$ | 1.66680 | 33.1 |  |
|  | $r_4=+0.28795$ |  |  |  | −2.31568 |
|  |  | $l_2=0.05960$ |  |  |  |
|  | $r_5=-4.15613$ |  |  |  | −0.12586 |
| $L_{III}$ |  | $d_3=0.01333$ | 1.52310 | 50.9 |  |
|  | $r_6=+0.35476$ |  |  |  | +0.55502 |
| $L_{IV}$ |  | $d_4=0.09200$ | 1.72000 | 50.3 |  |
|  | $r_7=-0.57041$ |  |  |  | +1.26225 |

I claim:

1. Photographic objective consisting of three elements separated from one another by air spaces, namely of a collective meniscus-shaped front element, of a dispersive biconcave middle lens and of a collective rear element, said rear element consisting of two cemented together lenses of opposite refractive power, the cement surface of the said rear element turning its convex side towards the middle lens and having a radius longer than 30% but shorter than 50% of the objective focal length, the radius of the surface of the said middle lens turned towards the said front element being greater in amount than 95% but smaller in amount than 150% of the objective focal length, and the first air space being smaller than the second, the over-all length being more than 20%, but less than 50% of the focal length, and the sum of the refractive powers of the two outer surfaces lying within the limits $2.8/f$ and $4.2/f$, and the sum of the refractive powers of the two surfaces of the two collective outer elements turned towards the middle lens lying within the limits $-0.60/f$ and $-0.15/f$, and the sum of the refractive powers of the two concave surfaces of the middle lens lying within the limits $-3.2/f$ and $-2.6/f$.

2. Photographic objective consisting of three elements separated from one another by air spaces, namely of a collective meniscus-shaped front element, of a dispersive biconcave middle lens and of a collective rear element, said rear element consisting of two cemented together lenses of opposite refractive power, the cement surface of the said rear element turning its convex side towards the middle lens and having a radius longer than 30% but shorter than 50% of the objective focal length, the radius of the surface of the said middle lens turned towards the said front element being greater in amount than 95% but smaller in amount than 150% of the objective focal length, and the first air space being smaller than the second, the over-all length being more than 20%, but less than 50% of the focal length, and the sum of the refractive powers of the two outer surfaces lying within the limits $2.8/f$ and $4.2/f$, and the sum of the refractive powers of the two surfaces of the two collective outer elements turned towards the middle lens lying within the limits $-0.60/f$ and $-0.15/f$, and the sum of the refractive powers of the two concave surfaces of the middle lens lying within the limits $-3.2/f$ and $-2.6/f$, the refractive powers $(\Delta N/r)$ each differing by at most $\pm 0.15/f$ and the lens thicknesses $(d)$ and the air distances $(l)$ each by at most $\pm 0.025 \cdot f$ from the values to be taken from the following numerical example:

| Lenses | Radii | Thicknesses and Distances | $N_D$ | V | $\Delta N/r$ |
|---|---|---|---|---|---|
| $L_I$ | $r_1=+0.331164 \cdot f$ | $d_1=0.05142 \cdot f$ | 1.72000 | 50.3 | $+2.17415/f$ |
|  | $r_2=+2.70729 \cdot f$ |  |  |  | $-0.26595/f$ |
|  |  | $l_1=0.03955 \cdot f$ |  |  |  |
| $L_{II}$ | $r_3=-1.10928 \cdot f$ | $d_2=0.05471 \cdot f$ | 1.64831 | 33.8 | $-0.58444/f$ |
|  | $r_4=+0.290927 \cdot f$ |  |  |  | $-2.22843/f$ |
|  |  | $l_2=0.05933 \cdot f$ |  |  |  |
| $L_{III}$ | $r_5=-3.17162 \cdot f$ | $d_3=0.01318 \cdot f$ | 1.53172 | 48.9 | $-0.16765/f$ |
| $L_{IV}$ | $r_6=+0.350781 \cdot f$ | $d_4=0.06592 \cdot f$ | 1.72000 | 50.3 | $+0.53675/f$ |
|  | $r_7=-0.564016 \cdot f$ |  |  |  | $+1.27656/f$ |

($r_1$ to $r_7$) = the radii of the refracting lens surfaces
($d_1$ to $d_4$) = the axial lens thicknesses
($l_1, l_2$) = the axial distances between the lens elements
$N_D$ = the refractive index of the lens materials
$V$ = dispersion ratio or Abbe number of the lens material
$f$ = the objective focal length = 1
$\Delta N/r$ = the refractive power of the surface having a radius ($r$)

3. Photographic objective consisting of three elements separated from one another by air spaces, namely of a collective meniscus-shaped front element, of a dispersive biconcave middle lens and of a collective rear element, said rear element consisting of two cemented together lenses of opposite refractive power, the cement surface of the said rear element turning its convex side towards the middle lens and having a radius longer than 30% but shorter than 50% of the objective focal length, the radius of the surface of the said middle lens turned towards the said front element being greater in amount than 95% but smaller in amount than 150% of the objective focal length, and the first air space being smaller than the second, the over-all length being more than 20%, but less than 50% of the focal length, and the sum of the refractive powers of the two outer surfaces lying within the limits $2.8/f$ and $4.2/f$, and the sum of the refractive powers of the two surfaces of the two collective outer elements turned towards the middle lens lying within the limits $-0.60/f$ and $-0.15/f$, and the sum of the refractive powers of the two concave surfaces of the middle lens lying within the limits $-3.2/f$ and $-2.6/f$, the refractive powers $(\Delta N/r)$ each differ by at most $0.15/f$ and the lens thicknesses $(d)$ and the air distance $(l)$ each by at most $\pm 0.025 \cdot f$ from the values to be taken from the following numerical example:

| Lenses | Radii | Thicknesses and Distances | $N_D$ | V | $\Delta N/r$ |
|---|---|---|---|---|---|
| $L_I$ | $r_1=+0.335931 \cdot f$ | $d_1=0.05220 \cdot f$ | 1.72000 | 50.3 | $+2.14330/f$ |
|  | $r_2=+2.74632 \cdot f$ |  |  |  | $-0.26217/f$ |
|  |  | $l_1=0.05352 \cdot f$ |  |  |  |
| $L_{II}$ | $r_3=-1.10918 \cdot f$ | $d_2=0.04891 \cdot f$ | 1.67270 | 32.2 | $-0.60648/f$ |
|  | $r_4=+0.299403 \cdot f$ |  |  |  | $-2.24680/f$ |
|  | $r_5=\infty$ | $l_2=0.06684 \cdot f$ |  |  | $0.00000/f$ |
| $L_{III}$ | $r_6=+0.335931 \cdot f$ | $d_3=0.01318 \cdot f$ | 1.59551 | 39.2 | $+0.44203/f$ |
| $L_{IV}$ | $r_7=-0.597381 \cdot f$ | $d_4=0.07910 \cdot f$ | 1.74400 | 44.7 | $+1.24544/f$ |

($r_1$ to $r_7$) = the radii of the refracting lens surfaces
($d_1$ to $d_4$) = the axial lens thicknesses
($l_1, l_2$) = the axial distances between the lens elements
$N_D$ = the refractive index of the lens materials
$V$ = dispersion ratio or Abbe number of the lens material
$f$ = the objective focal length = 1
$\Delta N/r$ = the refractive power of the surface having a radius ($r$)

4. Photographic objective consisting of three elements separated from one another by air spaces, namely of a collective meniscus-shaped front element, of a dispersive biconcave middle lens and of a collective rear element, said rear element consisting of two cemented together lenses of opposite refractive power, the cement surface of the said rear element turning its convex side towards the middle lens and having a radius longer than 30% but shorter than 50% of the objective focal length, the radius of the surface of the said middle lens turned towards the said front element being greater in amount than 95% but smaller in amount than 150% of the objective focal length, and the first air space being smaller than the second, the over-all length being more than 20%, but less than 50% of the focal length, and the sum of the refractive powers of the two outer surfaces lying within the limits $2.8/f$ and $4.2/f$, and the sum of the refractive powers of the two surfaces of the two collective outer elements turned towards the middle lens lying within the limits $-0.60/f$ and $-0.15/f$, and the sum of the refractive powers of the two concave surfaces of the middle lens lying within the limits $-3.2/f$ and $-2.6/f$, the refractive powers $(\Delta N/r)$ each differ by at most $\pm 0.15/f$ and the lens thicknesses $(d)$ and the air distances $(l)$ each by at most $\pm 0.025 \cdot f$ from the values to be taken from the following numerical example:

| Lenses | Radii | Thicknesses and Distances | $N_D$ | V | $\Delta N/r$ |
|---|---|---|---|---|---|
| $L_I$ | $r_1=+0.32776 \cdot f$ | $d_1=0.05200 \cdot f$ | 1.72000 | 50.3 | $+2.19673/f$ |
|  | $r_2=+2.66040 \cdot f$ |  |  |  | $-0.27064/f$ |
|  |  | $l_1=0.05000 \cdot f$ |  |  |  |
| $L_{II}$ | $r_3=-1.12187 \cdot f$ | $d_2=0.04267 \cdot f$ | 1.66680 | 33.1 | $-0.59436/f$ |
|  | $r_4=+0.28795 \cdot f$ |  |  |  | $-2.31568/f$ |
|  |  | $l_2=0.05960 \cdot f$ |  |  |  |
| $L_{III}$ | $r_5=-4.15613 \cdot f$ | $d_3=0.01333 \cdot f$ | 1.52310 | 50.9 | $-0.12586/f$ |
| $L_{IV}$ | $r_6=+0.35476 \cdot f$ | $d_4=0.09200 \cdot f$ | 1.72000 | 50.3 | $+0.55502/f$ |
|  | $r_7=-0.57041 \cdot f$ |  |  |  | $+1.26225/f$ |

($r_1$ to $r_7$) = the radii of the refracting lens surfaces
($d_1$ to $d_4$) = the axial lens thicknesses
($l_1, l_2$) = the axial distances between the lens elements
$N_D$ = the refractive index of the lens materials
$V$ = dispersion ratio or Abbe number of the lens material
$f$ = the objective focal length = 1

$\Delta N/r$ = the refractive power of the surface having a radius $(r)$

References Cited in the file of this patent

UNITED STATES PATENTS

| | | |
|---|---|---|
| 721,240 | Rudolph | Feb. 24, 1903 |
| 1,558,073 | Bielicke | Oct. 20, 1925 |
| 1,849,681 | Merte et al. | Mar. 15, 1932 |
| 2,084,714 | Tronnier | June 22, 1937 |

FOREIGN PATENTS

| | | |
|---|---|---|
| 583,984 | Great Britain | Jan. 3, 1947 |
| 714,565 | Great Britain | Sept. 1, 1954 |